(12) United States Patent
Huang

(10) Patent No.: US 11,557,322 B2
(45) Date of Patent: Jan. 17, 2023

(54) METHOD AND DEVICE FOR GENERATING MULTIMEDIA RESOURCE

(71) Applicant: BEIJING DAJIA INTERNET INFORMATION TECHNOLOGY CO., LTD., Beijing (CN)

(72) Inventor: Weibin Huang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/479,549

(22) Filed: Sep. 20, 2021

(65) Prior Publication Data
US 2022/0005508 A1 Jan. 6, 2022

Related U.S. Application Data

(63) Continuation of application No. PCT/CN2020/127856, filed on Nov. 10, 2020.

(30) Foreign Application Priority Data

Jan. 2, 2020 (CN) .................. 202010003239.X

(51) Int. Cl.
*G11B 27/031* (2006.01)
(52) U.S. Cl.
CPC ................. *G11B 27/031* (2013.01)
(58) Field of Classification Search
CPC ...................................... G11B 27/031
See application file for complete search history.

(56) References Cited

U.S. PATENT DOCUMENTS

| 6,954,894 B1 * | 10/2005 | Balnaves | G11B 27/034 |
| | | | 715/202 |
| 2005/0084232 A1 * | 4/2005 | Herberger | G11B 27/34 |
| | | | 386/282 |

(Continued)

FOREIGN PATENT DOCUMENTS

| CN | 1447333 A | 10/2003 |
| CN | 104168417 A | 11/2014 |

(Continued)

OTHER PUBLICATIONS

The State Intellectual Property Office of People's Republic of China, Third Office Action in Patent Application No. CN202010003239.X dated Feb. 17, 2022, which is a foreign counterpart application corresponding to this U.S. Patent Application, to which this application claims priority.

(Continued)

*Primary Examiner* — Mishawn N. Hunter
(74) *Attorney, Agent, or Firm* — Kolitch Romano Dascenzo Gates LLC

(57) ABSTRACT

Provided is a method for generating a multimedia resource. The method including: displaying at least one selectable clipping template, wherein each clipping template is generated based on clipping information, and the clipping information includes at least one of clip operation information and clipping material information; determining a target clipping template from the at least one selectable clipping template, in response to a template select instruction; and generating a second multimedia resource by processing an acquired first multimedia resource based on the target clipping template.

18 Claims, 4 Drawing Sheets

(56) References Cited

U.S. PATENT DOCUMENTS

| | | | |
|---|---|---|---|
| 2011/0276881 A1 | 11/2011 | Keng et al. | |
| 2012/0284625 A1 | 11/2012 | Kalish et al. | |
| 2015/0318020 A1 | 11/2015 | Pribula | |
| 2016/0007098 A1* | 1/2016 | Southam | H04N 21/84 |
| | | | 725/32 |

FOREIGN PATENT DOCUMENTS

| | | |
|---|---|---|
| CN | 105320509 A | 2/2016 |
| CN | 106028119 A | 10/2016 |
| CN | 106844705 A | 6/2017 |
| CN | 106973304 A | 7/2017 |
| CN | 108391063 A | 8/2018 |
| CN | 108900897 A | 11/2018 |
| CN | 109168028 A | 1/2019 |
| CN | 109389428 A | 2/2019 |
| CN | 109963205 A | 7/2019 |
| CN | 110536177 A | 12/2019 |
| CN | 111243632 A | 6/2020 |
| WO | 0039997 A2 | 7/2000 |
| WO | 2016128984 A1 | 8/2016 |
| WO | 2016168984 A1 | 10/2016 |
| WO | 2017051793 A1 | 3/2017 |

OTHER PUBLICATIONS

International Search Report of the International Searching Authority for State Intellectual Property Office of the People's Republic of China in PCT application No. PCT/CN2020/127856 dated Jan. 28, 2021, which is an international application corresponding to this U.S. application.

The State Intellectual Property Office of People's Republic of China, First Office Action in Patent Application No. CN202010003239.X dated Dec. 2, 2020, which is a foreign counterpart application corresponding to this U.S. Patent Application, to which this application claims priority.

The State Intellectual Property Office of People's Republic of China, Second Office Action in Patent Application No. CN202010003239.X dated Apr. 19, 2021, which is a foreign counterpart application corresponding to this U.S. Patent Application, to which this application claims priority.

Rejection of Decision of Chinese Application No. 202010003239.X dated Aug. 31, 2021.

European Patent Office, Extended European Search Report pursuant to Rule 62 EPC, dated May 3, 2022 in Patent Application No. 20910024.7, which is a foreign counterpart to this U.S. Application.

Communication pursuant to Article 94(3) EPC of European application No. 20910024.7 dated May 13, 2022.

* cited by examiner

| Template details |
|:---:|
| Preview video |
| Introduction
　　XXXXXXXXX Template,
　　XXXXXXXXXXXX
Operation
　Frame scale： 16:9
　Transition： Superimposing-black
　Changing speed： 0.2 time
　　　　　　：
Operation
　Filter： F1
　Music　My motherland
　Sound effect： Fireworks |

FIG. 3

METHOD AND DEVICE FOR GENERATING MULTIMEDIA RESOURCE

CROSS-REFERENCE TO RELATED APPLICATIONS

This application is a continuation application of international application No. PCT/CN2020/127856, filed on Nov. 10, 2020, which claims priority to Chinese Patent Application No. 202010003239.X, filed on Jan. 2, 2020. Both applications are incorporated herein by reference in their entireties.

TECHNICAL FIELD

The present disclosure relates to the field of multimedia technologies, and in particular, relates to a method and a device for generating a multimedia resource.

BACKGROUND

With the development of multimedia technologies, people often produce multimedia resources by clipping multimedia resources into the style that they prefer.

SUMMARY

The present disclosure provides a method and a device for generating a multimedia resource.

According to one aspect of embodiments of the present disclosure, a method for generating a multimedia resource is provided. The method includes:

displaying at least one selectable clipping template, wherein each clipping template is generated based on clipping information, and the clipping information includes at least one of clip operation information and clipping material information;

determining a target clipping template from the at least one selectable clipping template, in response to a template select instruction; and generating a second multimedia resource by processing an acquired first multimedia resource based on the target clipping template.

According to another aspect of the embodiments of the present disclosure, an electronic device is provided. The electronic device includes:

one or more processors; and one or more memories configured to store one or more instructions executable by the one or more processors, wherein the one or more processors, when loading and executing the one or more instructions, are caused to: display at least one selectable clipping template, wherein each clipping template is generated based on clipping information, and the clipping information includes at least one of clip operation information and clipping material information; determine a target clipping template from the at least one selectable clipping template, in response to a template select instruction; and generate a second multimedia resource by processing an acquired first multimedia resource based on the target clipping template.

According to yet another aspect of the embodiments of the present disclosure, a non-transitory computer-readable storage medium storing one or more instructions therein is provided, wherein the one or more instructions, when loaded and executed by a processor of an electronic device, cause the electronic device to: display at least one selectable clipping template, wherein each clipping template is generated based on clipping information, and the clipping information includes at least one of clip operation information and clipping material information; determine a target clipping template from the at least one selectable clipping template, in response to a template select instruction; and generate a second multimedia resource by processing an acquired first multimedia resource based on the target clipping template.

BRIEF DESCRIPTION OF THE DRAWINGS

FIG. 3 is a schematic diagram of a terminal interface according to an exemplary embodiment of the present disclosure;

DETAILED DESCRIPTION

For better understanding of the technical solutions of the present disclosure by those of ordinary skill in the art, the technical solutions in the embodiments of the present disclosure are clearly and completely described in the following with reference to the accompanying drawings.

It is to be noted that terms "first," "second," and the like in the description, claims, and accompanying drawings of the present disclosure are intended to distinguish between similar objects but do not necessarily indicate a specific order or sequence. It should be understood that data used in such a way can be exchanged under proper conditions to make it possible to implement the described embodiments of present disclosure in sequences except those illustrated or described herein. The embodiments and practice thereof described herein do not represent all embodiments and practice consistent with the present disclosure. On the contrary, these embodiments and practice are merely embodiments of a device and a method detailed in the appended claims and consistent with some aspects of the present disclosure.

User information involved in the present disclosure includes information authorized by a user or fully authorized by various parties.

In the related art, to clip a first multimedia resource, a user usually needs to open a clipping application and clips the first multimedia resource in the clipping application to generate a second multimedia resource. However, clipping the first multimedia resource usually requires high technical skills. For the ordinary users who are unskilled in clipping technology, it is difficult for them to generate a second multimedia resource that meets their expectations. In addition, it takes a long time to manually clip the multimedia resource, and thus the efficiency of generating the second multimedia resource is low.

Figure 1:
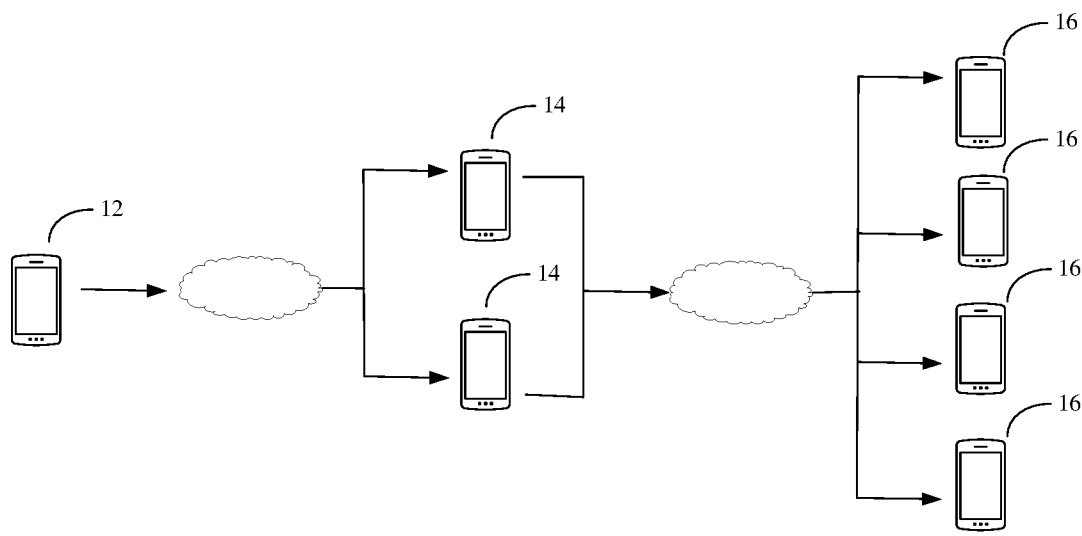
FIG. 1 shows an implementation environment of a method for generating a multimedia resource according to an exemplary embodiment of the present disclosure.

FIG. 1 shows an implementation environment of a method for generating a multimedia resource according to an exemplary embodiment. As shown in FIG. 1, the implementation environment involves a plurality of electronic devices. The electronic device is a terminal or a server. In FIG. 1, the case where the electronic device is taken as the terminal is used as an example for illustration.

Referring to FIG. 1, the method for generating the multimedia resource is applicable to a first electronic device 12. In response to generating a clipping template, the first electronic device 12 sends the clipping template to second electronic devices 14 through cloud, such that both the first electronic device 12 and the second electronic devices 14 can generate a new multimedia resource based on the clipping template. In some embodiments, the second electronic devices 14 send the clipping template or the multimedia resource to the third electronic devices 16 through the cloud.

It should be noted that the second and third electronic devices 14, 16 can also generate a clipping template, and can generate a multimedia resource based on the clipping template generated by themselves or shared by other electronic devices.

In embodiments of the present disclosure, a method for generating a multimedia resource is provided. The method for generating the multimedia resource is configured to generate a new multimedia resource based on a clipping template, wherein the clipping template is generated based on a method for generating a clipping template. An execution subject of the method for generating the clipping template and an execution subject of the method for generating the multimedia resource are the same electronic device or different electronic devices. In the case that the execution subject of the method for generating the clipping template and the execution subject of the method for generating the multimedia resource are the same electronic device, the electronic device generates the clipping template based on clipping information, and acquires a second (new) multimedia resource by using the clipping template to clip a first (initial) multimedia resource. In the case that the execution subject of the method for generating the clipping template and the execution subjection of the method for generating the multimedia resource are different electronic devices, one electronic device generates the clipping template based on the clipping information and shares the clipping template with the other electronic device, and the other electronic device generates the second multimedia resource based on the clipping template. The method for generating the clipping template is described hereinafter by the embodiment shown in FIG. 2, and then, the method for generating the multimedia resource is described by the embodiment shown in FIG. 4.

Figure 2:
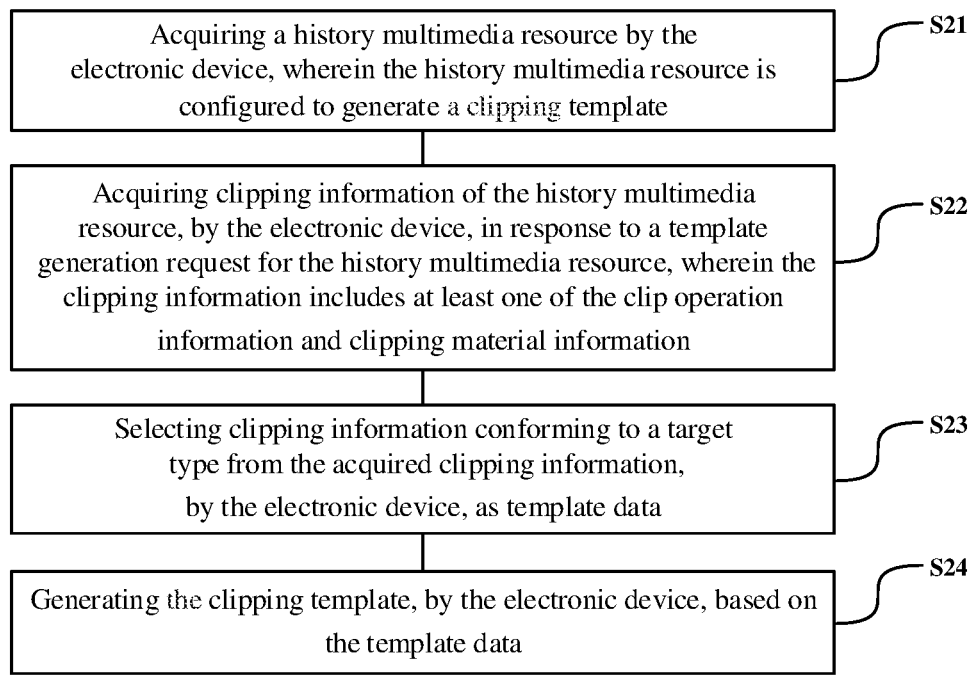
FIG. 2 is a flowchart of a method for generating a clipping template according to an exemplary embodiment of the present disclosure.

FIG. 2 is a flowchart of a method for generating a clipping template according to an exemplary embodiment of the present disclosure. As shown in FIG. 2, the method for generating the clipping template is executed by an electronic device and includes the followings.

In S21, the electronic device acquires a history multimedia resource, wherein the history multimedia resource is configured to generate a clipping template.

In embodiments of the present disclosure, the electronic device acquires the history multimedia resource, wherein the history multimedia resource is a clipped multimedia resource. The electronic device generates the clipping template based on clipping information of the history multimedia resource, such that the clipping template is similar to a clipping situation of the history multimedia resource, and this clipping template can be directly used to generate a new multimedia resource subsequently.

The history multimedia resource is acquired by clipping on the electronic device, or acquired by receiving a clipped history multimedia resource from another electronic device, or acquired by downloading from a target address. A specific source of the history multimedia resource is not limited in embodiments of the present disclosure.

The history multimedia resource being a video is taken as an example. In one embodiment, in the case that the video is clipped by a user and the user is satisfied with a playing effect of the video, a clipping template is generated, based on the video, by the electronic device, and subsequently, a video having the same or similar clipping effect can be acquired quickly and efficiently based on the clipping template. In another embodiment, in the case that the user likes a video clipped by another user, a clipping template is generated, based on the video, by the electronic device, and a video clipped for the user can be acquired based on the clipping template, such that a video production need of the user is met, thus a user's personalized clipping need is satisfied, and clipping efficiency is improved.

In S21, the electronic device acquires the history multimedia resource, and displays the history multimedia resource. Thus, the user may want to generate a clipping template similar to the clipping situation of the history multimedia resource upon seeing the display effect. In this way, a new multimedia resource can be quickly generated with the clipping template, which is convenient and quick. Furthermore, clipping situation of the new multimedia resource is similar to the clipping situation of the history multimedia resource. Moreover, the clipping temperate can be generated, simply based on the clipped history multimedia resource, by the electronic device and without a technician, such that the clipping template conforming to a clipping habit of the user can be generated. In addition, the clipping template is not fixed, and is flexible and variable in form.

In some embodiments, the user operations and the method for generating the clipping template are performed on the same device or different devices. For example, in the case that the user operations and the method for generating the clipping template are performed on the same device, and the user wants to generate the clipping template upon seeing the history multimedia resource, the template generation operation is performed by the electronic device. For example, the user selects the history multimedia resource, and triggers a template generation control, to trigger a template generation request for the history multimedia resource to the electronic device; and the electronic device directly responds to the template generation request to perform S22. In the case that the user operations and the method for generating the clipping template are performed on different devices, the user performs the template generation operation on another device, triggers the template generation request, and the another electronic device sends the template generation request to the electronic device. Thus, the electronic device performs S21, and performs S22 in response to the template generation request. The way adopted is not limited in embodiments of the present disclosure.

In S22, the electronic device acquires clipping information of the history multimedia resource in response to a template generation request for the history multimedia resource, wherein the clipping information includes at least one of the clip operation information and clipping material information.

For the received template generation request, the electronic device performs the process of generating a template in response to the template generation request. The electronic device acquires the clipping information of the history multimedia resource, and takes the clipping information as the base of data/information for generating the clipping template. The clipping information includes at least one of the clip operation information and the clipping material information. That is, during a process of clipping the multimedia resource, some properties of the multimedia resource may be modified by a clip operation, and some materials may be added to the multimedia resource, such that the history multimedia resource can be acquired by combining the materials and the multimedia resource.

In some embodiments, the clip operation information may include the information of at least one of clip operations including adjusting a picture frame, adjusting a video ratio, scaling the frame, moving the frame, changing speed, reversing, rotating, changing sound, changing volume, adding a transition, adding a filter, adding music, adding a sound effect, adding dubbing, adding a subtitle, adding a sticker and adding a cover. The clip operation information may further include the information of other clip operations, which is not enumerated herein. The clipping material information may include the information of at least one of a filter, music, a sound effect, a sticker, and a cover. The clipping material information may further include the information of other materials, which is not enumerated herein.

The clip operation information at least includes an operation type and operation content of at least one clip operation. The operation type may include, but is not limited to, adjusting a picture frame, adjusting a video ratio, scaling the frame, moving the frame, changing speed, reversing, rotating, changing sound, changing volume, adding a transition, adding a filter, adding music, adding a sound effect, adding dubbing, adding a subtitle, adding a sticker, and adding a cover. The operation content may include adjusting the picture frame, for example, adjusting a size of the picture frame. The above is only an exemplary description and not limited to the present disclosure. In other embodiments, an operation sequence of clip operations is different, and thus, final clipping effects of the multimedia resource can be different. The clip operation information further includes the operation sequence of a plurality of clip operations. For example, the user performs multiple types of clip operations (such as reducing a frame in a first operation, enlarging the frame in a second operation, and reducing the frame in a third operation), and the electronic device records the operation sequence of the plurality of the clip operations.

With respect to the clipping material information, the clipping material information includes a material type, material content or a material acquisition manner of at least one material, wherein the material type may include filter, music, sound effect, sticker, cover, and the like. The material type may include others, which is not enumerated herein. The material content is the material itself used for clipping. For example, the material content is an audio file, a configuration file corresponding to a sound effect, a sticker, or a picture corresponding to a cover. The material acquisition manner includes an acquisition address of the material. For example, the material content is stored in a storage corresponding to the acquisition address, and the electronic device acquires the material content from the storage based on the acquisition address.

In S22, the process for acquiring the clipping information by the electronic device may include various implementations. In some embodiments, the clipping information is information recorded in the clipping process; and the information recorded in the clipping process is stored in a clip operation log, such that the clipping information can be extracted from the clip operation log. In other embodiments, the clipping information is information acquired by performing comparison analysis on the history multimedia resource and the initial multimedia resource. The implementation adopted is not limited in embodiments of the present disclosure. In some embodiments, two implementations are provided below.

In a first example, the electronic device acquires the clip operation log of the history multimedia resource, and extracts clipping information from the clip operation log, wherein the clipping information is information of clipping the history multimedia resource. Because the clipping information can include different pieces of information, the first example can include the following cases. In some embodiments, the clipping information may at least include clip operation information, and the electronic device extracts the clip operation information of the history multimedia resource from the clip operation log. The clip operation information is configured to describe all clip operations for clipping the history multimedia resource or a final result of clip operation.

By acquiring the clip operation log and taking the clip operation information in the clip operation log as the base of data for generating the clipping template, the clipping template can indicate an actual clipping process of the history multimedia resource. By clipping the multimedia resource based on the clipping template generated in this way, it is possible to clip the multimedia resource with similar or same clipping processes. An acquired new multimedia resource is similar to the history multimedia resource in the display effect, thus the clipping process is accurate. Since the acquired clipping template is more conforming to the clipping habits of the user, the clipped multimedia resource meets the need of the user better.

In other embodiments, the clipping information may further include the clipping material information. The electronic device further extracts the clipping material information used by the history multimedia resource from the clip operation log. The clipping material information at least includes a material type, material content and a material acquisition manner of at least one material.

By acquiring the information from the clip operation log as the base of data for generating the clipping template, the clipping template that conforms to the clipping habits of the user and meets the need of the user can be generated. Both the clip operation information and the clipping material information are acquired from the clip operation log, such that the generated clipping templates are rich and diverse, flexible and changeable in form. Convenience is provided for both the clip operation and the material, the user operations are simplified, and a generation effect and practicability of the clipping templates are improved.

In the first example, in the case that the user clips the multimedia resource, the electronic device records the user's clip operation information or the used material information, and stores the recorded information in the clip operation log. In the case that the history multimedia resource is acquired later, the clip operation log may be taken as a history clipping path of the history multimedia resource. How the history multimedia resource was clipped can be clearly known through the clip operation log.

In some embodiments, the clip operation log further includes various cases. In a first case, the clipping record includes clip operation information of each clip operation performed by the user or the material information used by the user. In a second case, the clip operations performed by the user are managed, such that the clip operation information or the used material information that can indicate a final clipping effect of the history multimedia resource can be acquired. For example, in the second case, operation content of the clip operations with different operation types are combined by the electronic device to acquire the information of managed clip operations. For example, in the first case, the clipping record can record multiple operations of the user, and the final clipping result can be a final result obtained by performing multiple operations. For instance, the user can reduce the frame once and enlarge the frame once, and the final clipping result is that the frame is enlarged. In the second case, the clipping record can directly record the operation type of reducing/enlarging the frame, and the operation content is a specific scale of the enlarged frame.

In a second example, the electronic device acquires an original multimedia resource which is clipped to generate the history multimedia resource, and acquires clipping information of the history multimedia resource by comparing and analyzing the original multimedia resource and the history multimedia resource.

The electronic device can directly compare and analyze the history multimedia resource and the original multimedia resource. In the case that there is a difference between the two multimedia resources, how to transform from the original multimedia resource to the history multimedia resource can be analyzed, and the transformation process is the clipping information. By acquiring the clipping information through comparing and analyzing the two multimedia resources, there is no need to record the clipping processes one by one, and the final clipping effect of the history multimedia resource can be acquired directly based on the comparison and analysis. Generation of the clipping template can be completed quickly and efficiently with this clipping information. And the generated clipping template can indicate the final clipping effect of the history multimedia resource, and conforms to the clipping habits or needs of the user, and improves the generation efficiency.

In the case that the multimedia resource is a video, the electronic device compares the history multimedia resource and the original multimedia resource frame by frame. In the case that there is a difference between any frame of the history multimedia resource and a corresponding frame of the original multimedia resource, the electronic device acquires at least one of clip operation information or used material information needed to transform from the frame of the original multimedia resource to the frame of the history multimedia resource.

In S23, the electronic device selects clipping information conforming to a target type from the acquired clipping information, as template data.

In some embodiments, the generated clipping template is used to clip the multimedia resource directly based on the clipping template, and thus there is no need to repeat the same clip operation. The clip operations or materials included in the clipping information may not be universal. Thus, the non-universal clipping information may not be used as required content to generate the clipping template. The universal clipping information is used to generate a clipping template for repeated utilization, thereby effectively improving a utilization rate and practicability of the generated clipping template.

In some embodiments, whether the clipping information is universal is determined by relevant technicians in accordance with requirements. That is, the target type is determined, and quantity of the target type is one or more. Regarding the different information that may be included in the clipping information, the processes performed by the electronic device in S23 may be different.

For the case that the clipping information of the history multimedia resource at least includes the clip operation information, the target type at least includes a target operation type. Accordingly, in S23, the electronic device selects the clip operation information conforming to the target operation type from the clip operation information of the history multimedia as the template data. The clip operation information of the target operation type is universal, and the template data generated subsequently can indicate the universal clip operation process in the clipping process of the history multimedia resource. Thus, this not only conforms to the clipping habits of a user, but also meets the needs of the user. In addition, special clipping of a single multimedia resource by the user can be eliminated, and the acquired clipping template is relatively practical and applicable.

For the case that the clipping information of the history multimedia resource further includes an operation sequence of a plurality of clip operations, in S23, the electronic device correlates the clip operation information conforming to the target operation type based on the operation sequence, and takes the correlated clip operation information as the template data. In this way, the operation sequence corresponding to the clip operation information in the template data is clear. The clipping template is generated based on such template data. In the case that the clipping template is used, a multimedia resource can be processed based on such operation sequence, such that the operation sequence of clipping is same as the operation sequence of clipping the history multimedia resource, which can ensure that the clipping method to acquire a new multimedia resource is similar to or same as the clipping method to acquire the history multimedia resource, which more conforms to the clipping habits of the user. That is, the template data is more accurate, and thus, the generated clipping template is more conforming to expectations of the user.

For the case that the clipping information of the history multimedia resource at least includes the clipping material information, the target type at least includes a target material type, wherein the target material type is a universal material type. In S23, the electronic device selects clipping material information conforming to the target material type from the clipping material information, and takes the selected clipping material information as the template data. In this case, the clipping information includes the clipping material information. Thus, universal clipping material information is selected as the template data. The clipping template generated subsequently includes how to clip the material, such that a new multimedia resource generated based on the clipping template can be the same as or similar to the history multimedia resource in terms of the material. In this way, the clipping template conforms to the clipping habits of the user in terms of the material or personalized clipping requirements of the user. The template data can be automatically selected to generate the clipping template, thereby effectively improving the generation efficiency of the clipping template.

Both the clip operation information and the clipping material information have been described above. In some embodiments, the clipping information includes the clip operation information or the clipping material information, or includes both the clip operation information and the clipping material information, which is not limited in embodiments of the present disclosure.

In S24, the electronic device generates the clipping template based on the template data.

In response to acquiring the template data by selecting the clipping information, the electronic device can perform the process of generating the clipping template. It can be known from the above process that the information included in the template data can be different. In the case that the included information is different, the process of generating the clipping template can be different.

In some embodiments, the template data includes the clip operation information conforming to the target operation type. In this case, the process of generating the clipping template may be as follows. The electronic device acquires the clipping template including a clip operation option by generating a corresponding clip operation option based on the clip operation information. The clip operation option indicates the clip operation. For example, the clip operation information of enlarging a frame includes enlarging the frame and a magnification, such that the clip operation option of enlarging the frame can be generated and used as a part of the clipping template.

By performing the above process, the clipping template includes at least one clip operation option. How to clip the multimedia resource can be known based on the clip operation option, and the template data using in the generation process is selected based on the clipping information of the history multimedia resource. The clip operation option in the generated clipping template is the same as the clipping method of acquiring the history multimedia resource by clipping. Thus, the clipping template conforming to the clipping habits of the users and personalization can be generated, without manual processing, thereby improving the generation efficiency of the clipping template, and further improving the efficiency of clipping the multimedia resource.

In the case that the clip operation information further includes an operation sequence of at least one clip operation, the acquired clip operation information conforming to the target operation type in the template data is correlated based on the operation sequence of a plurality of clip operations. Accordingly, the process of generating the clipping template may be as follows. The electronic device acquires the clipping template including clip operations and a trigger sequence of the clip operation options by generating corresponding clip operation options and the trigger sequence based on a correlation relationship of the clip operation information conforming to the target operation type.

The clip operation options are generated based on the clip operation information, and a trigger sequence of the clip operation options corresponds to the clipping sequence of the history multimedia resource. Thus, the clipping template can clearly indicate the clip operations conforming to the target operation type and the corresponding sequence of the clip operations. The clipping template is accurate and fits the actual clipping situation of the history multimedia resource. Therefore, the clipping template is more conforming to expectations and clipping habits of the user, and is more practical. The new multimedia resource generated based on the clipping template is closer to the history multimedia resource, and the clipping result is more accurate.

In some embodiments, the template data includes the clipping material information conforming to the target material type. For this clipping material information, the process of generating the clipping template may be as follows. The electronic device acquires the clipping template including a material option by generating a corresponding material option based on the clipping material information. Thus, the clipping material information is converted into the material option in the clipping template. The material option can clearly indicate the material information used in generating the history multimedia resource. The clipping of the material is the same as the clipping of the material done by the user before, such that the generated clipping template is more conforming to the clipping habits of the user, and a clipping result acquired based on this clipping template is more accurate. Thus, a generating effect of the clipping template is better.

In some embodiments, the clipping material information includes a material type, material content or a material acquisition manner of at least one material. The generation process of the material option and the generation process of the clipping template may be as follows. The electronic device generates a material acquisition path associated with the corresponding material option based on the material type and the material acquisition manner in the clipping material information; and acquires the clipping template including the material option by adding material content to a directory indicated by the material acquisition path based on the material content in the clipping material information.

Properties of the clipping options are generated based on various information in the clipping material information. The material content can be accurately acquired from the corresponding position based on the clipping option, such that clipping can be performed based on the material content. The clipping template including the material option is rich in content and flexible in form, and complex clipping can be performed with the generated clipping template based on the material option. Thus, the generated clipping template is high in practicability and good in clipping effect. In this way, based on the clipping template, a new multimedia resource can be generated by using the same material, and is more similar to the history multimedia resource. Thus, it is easier to meet user's expectations.

In some embodiments, the clipping template is stored as description information. The description information includes description information of the clip operation, or includes description information of the used material, or includes description information of the clip operation and description information of the used material.

For example, the clip operation information and the clipping material information are called codes. A user clips a video by following operations: cutting 0-5 seconds of the video (coded as operation A), adding a superimposing-black transition at the beginning of the video (coded as operation B), adding a light-style music (coded as material a), adding a "clear" filter (coded as material b), and adding dubbing commentaries in 0-5 seconds (coded as material c) to complete the clipping. A program records and stores the user operations A, B and the used materials a, b, c. The operations A, B are scanned, and the operation B is extracted in the case that A is not universal and B is universal. The materials a, b, c are scanned, and the materials a, b are extracted in the case that c is not universal and a, b are universal. A template is generated based on the operation B and the materials a, b.

In response to generating the clipping template in S24, the electronic device further displays the generated clipping template. In some embodiments, the electronic device provides a template displaying interface to display the clipping template. The user can see the displayed clipping template, wherein the clipping template includes at least one of a clip operation option and a clipping material option. In the case that the user wants to preview a clipping effect, he/she can preview the clipping template, such that the electronic device can receive a preview instruction performed on the clipping template and determine a template option corresponding to an operation position of the preview instruction in response to the preview instruction. The template option at least includes one of the clip operation option and the clipping material option. Further, the electronic device can display preview content of the template option based on template data corresponding to the template option.

By previewing the clipping template, the user can view a real clipping effect of the clipping template and determine whether his/her expected effect is achieved. Thus, in the case that his/her own needs are met, the clipping template is utilized. Thus, a waste of a computing resource is avoided, and such waste of the computing resource is caused by repeated generation of the clipping template as an effect of a multimedia resource generated directly by using the clipping template is not as expected.

During displaying the clipping template on the template displaying interface, the clip operation options may be automatically categorized and displayed based on the target operation type. For example, as shown in FIG. 3, various clip operations included in the clipping template are displayed according to the categories. For example, the template display interface has a preview video region, and a preview video related to the clipping template is displayed in this region. The user can see a schematic diagram of a specific scaled-down frame in the "preview video" region by clicking a button of "Frame Scale", and similarly, the user can see a schematic diagram of a transition by clicking a button of "Transition."

In some embodiments, a plurality of operation positions may be defined for the preview instruction, and the operation positions correspond to a plurality of template options. In this way, during displaying the preview content, preview content with superimposed clipping effects is provided based on the template options, such that the user can know a more real clipping effect, thereby avoiding repeated operations. In some embodiments, the electronic device displays integrated content corresponding to a plurality of the template options based on template data corresponding to the template options; and the integrated content includes superimposed content of the template options.

In some embodiments, for the template options corresponding to the operation positions, in a superimposed display process, the electronic device acquires a plurality of preview contents corresponding to the template options based on the template data corresponding to the template options, and displays the synthesized content acquired by synthesizing the preview contents. By synthesizing the preview contents instead of previewing the contents separately, a clipping effect embodying superimposition of a plurality of clipping effects can be shown to the user, and is closer to the real clipping effect of the clipping template, such that above situation of repeated clipping caused by an unexpected clipping effect can be avoided, improving the diversity of displaying forms and the practicability of the clipping template.

The clipping template can be shared by a current user to other users. In some embodiments, the electronic device sends the clipping template, in response to a sharing instruction on the clipping template, to a user account indicated by the sharing instruction, such that the user's operations are reduced overall, and the practicability of the clipping template is improved.

According to embodiments of the present disclosure, by selecting the clipping information of the history multimedia resource conforming to the target type as template data, and generating the clipping template automatically based on the template data, the clipping template can be generated based on any history multimedia resource to meet personalized clipping requirements of the user without manual configuration or clipping, thereby improving the efficiency of clipping the multimedia resource.

Figure 4:
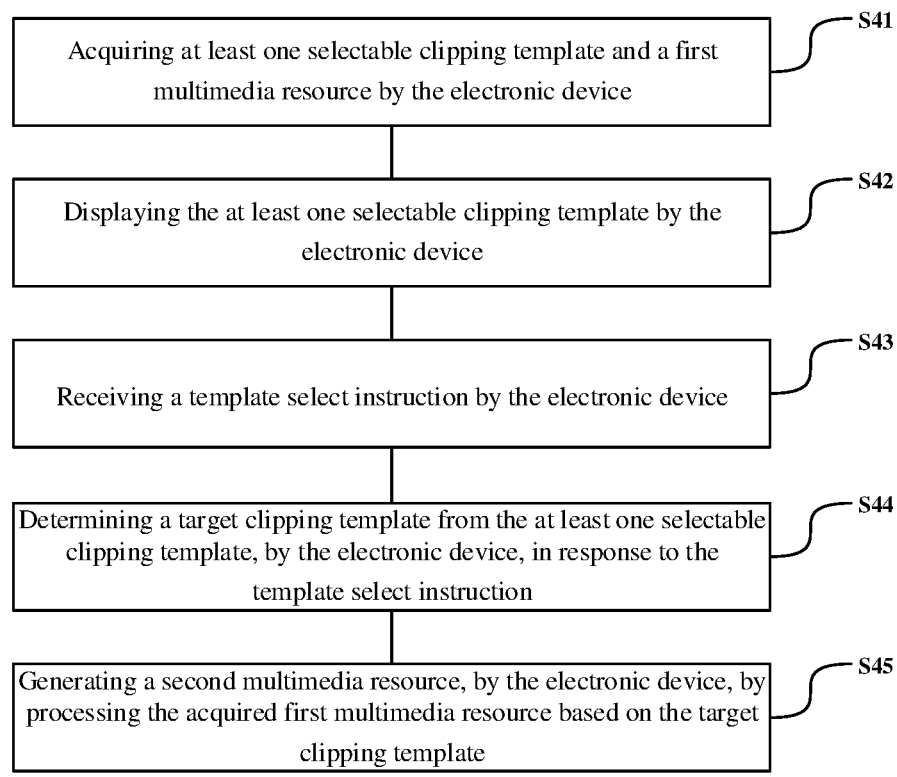
FIG. 4 is a flowchart of a method for generating a multimedia resource according to an exemplary embodiment of the present disclosure.

FIG. 4 is a flowchart of a method for generating a multimedia resource according to an exemplary embodiment of the present disclosure. As shown in FIG. 4, the method for generating the multimedia resource is executed by an electronic device. The method includes the following processes.

In S41, the electronic device acquires at least one selectable clipping template and a first multimedia resource, wherein each clipping template is generated based on clipping information, and the clipping information includes at least one of clip operation information and clipping material information.

In the present disclosure, the electronic device acquires the clipping template and the first multimedia resource, and acquires a second multimedia resource by clipping the first multimedia resource based on the clipping template.

In some embodiments, the electronic device provides one or more clipping templates for the user to select. For a method for generating the selectable clipping template, reference can be made to the above embodiment shown in FIG. 2, which is not repeated herein.

In S42, the electronic device displays the at least one selectable clipping template.

For a process of displaying the clipping template by the electronic device, reference can be made to the above process of previewing and displaying the clipping template after S24. The user can preview a clipping effect of the clipping template based on the displayed content, which is not repeated here in embodiments of the present disclosure.

In S43, the electronic device receives a template select instruction.

The template select instruction to the electronic device is triggered by the user. In the case that the user sees the displayed selectable clipping templates, the user can choose a clipping template he/she likes or needs based on displaying effects of the clipping templates. The user performs a template selection operation on the electronic device, and the electronic device receives the template select instruction triggered by the template selection operation, and performs S44 based on the template select instruction.

In S44, the electronic device determines a target clipping template from the at least one selectable clipping template, in response to the template select instruction.

The electronic device can select the clipping template indicated by the template select instruction as the target clipping template in response to the template select instruction, and perform the following S45 based on the target clipping template. The target clipping template includes at least one of a clip operation option and a material option.

In S45, the electronic device generates a second multimedia resource by processing the acquired first multimedia resource based on the target clipping template.

The electronic device can generate the multimedia resource upon determining the target clipping template.

Based on the different generation process of the target clipping template, contents included in the target clipping template are different. Accordingly, methods with which the electronic device generates the second multimedia resource based on the target clipping template are different.

In some embodiments, in the case that the target clipping template at least includes the clip operation option, the electronic device generates the second multimedia resource by clipping the first multimedia resource based on the clip operation option. For example, the target clipping template includes the clip operation option "enlarging a frame with an enlarging scale of 2;" and the electronic device enlarges a frame of the first multimedia resource by 2 times and acquires the second multimedia resource.

Based on the clip operation option in the target clipping template, the first multimedia resource can be directly clipped without manual clipping by the user, thus improving clipping efficiency and reducing technical skills required for clipping. Ordinary users can generate their favorite or required multimedia resources based on the clipping template. Therefore, the above clipping method is simple and convenient, and meets user's personalized needs.

In some embodiments, in the case that the target clipping template further includes a trigger sequence of clip operation options, in S45, the electronic device generates the second multimedia resource by clipping the acquired first multimedia resource based on the clip operation options according to the trigger sequence. In this way, the first multimedia resource is processed based on the trigger sequence of the clip operation options in the clipping template; and a processing sequence is the same as the trigger sequence, such that a clipping effect of the acquired second multimedia resource is more accurate, and better fits a clipping effect corresponding to the clipping template, thereby meeting needs of the user.

In some embodiments, in the case that the target clipping template at least includes the material option, in S45, the electronic device acquires material content based on the material option, and acquires the second multimedia resource by adding the material content to a corresponding position in the first multimedia resource.

The target clipping template can further provide a clipping function in terms of material. Based on the material option in the target clipping template, the material content can be automatically added to the first multimedia resource without manual uploading by the user, thus greatly improving the clipping efficiency. The material option is associated with a material acquisition path, and the material content is stored in a directory indicated by the material acquisition path. The electronic device acquires the material content from the directory indicated by the material acquisition path associated with the material option.

Properties of the material options are generated based on various information in the clipping material information. The material content can be accurately acquired from the corresponding position based on the clipping option, such that clipping can be performed based on the material content. The clipping template including the material option is rich in content and flexible in form, and complex clipping can be performed based on the material option. In this way, based on the clipping template, a new multimedia resource can be generated by using a material same as the material used in the history multimedia resource, and is more similar to the history multimedia resource. Thus, it is easier to meet user's expectations.

In response to acquiring the second multimedia resource, the electronic device can further display the second multimedia resource to display the clipping effect.

The above embodiments describe the process of generating the second multimedia resource by the electronic device based on the target clipping template. In the case that the user thinks that the clipping effect of the clipping template does not completely meet his/her expectations, the user can further adjust the clipping template by clipping. The electronic device receives an edit instruction triggered by the edit operation, to edit the clip operation option or the material option in the target clipping template in response to the edit instruction on the target clipping template. For example, in the case that the user wants to upload other materials to replace the material content associated with the material option, the electronic device acquires the uploaded material content, adds the material content to the directory indicated by the material acquisition path corresponding to the material option, and deletes original material content.

In response to adjusting the clipping template, the electronic device can generate a multimedia resource based on an adjusted clipping template. The electronic device can generate the second multimedia resource by processing the first multimedia resource based on an edited target clipping template in response to a resource generate instruction. The resource generate instruction to the electronic device may be triggered by the user, such that the electronic device generates the second multimedia resource by processing the first multimedia resource based on the edited target clipping template in response to the received resource generate instruction. The electronic device provides the user with a clipping template editing function, and the user can edit the clipping template based on his/her needs or preferences, thus improving the clipping effect corresponding to the clipping template, and better meeting user's personalized needs.

After adjusting the clipping template, the electronic device can store an adjusted clipping template, and can generate a multimedia resource based on the adjusted clipping template. The electronic device can store an edited target clipping template in response to a store instruction. The store instruction to the electronic device may be triggered by the user, such that the electronic device stores the edited target clipping template in response to the received store instruction.

In the case that the edited target clipping template is stored, the user can directly clip the first multimedia resource based on the target clipping template, or acquire more multimedia resources that meet needs by performing batch processing on multiple first multimedia resources based on this target clipping template, such that the practicality of the clipping template is effectively improved.

In embodiments of the present disclosure, by selecting the target clipping template from the selectable clipping templates, the second multimedia resource is generated by processing the multimedia resource based on the target clipping template, such that the second multimedia resource can be acquired quickly, efficiently and automatically without manual clipping by the user, and the clipping efficiency is effectively improved. In addition, based on the clipping information, the corresponding clipping template, which is selectable to the user, is automatically generated, rather than a predetermined fixed clipping template. Thus, the user is provided with the rich and diverse clipping templates, thereby effectively meeting users' personalized clipping needs and improving the efficiency of the user in clipping the multimedia resources.

Figure 5:
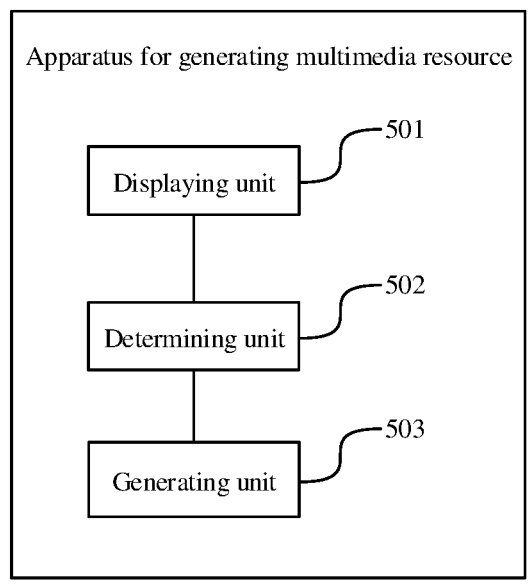
FIG. 5 is a block diagram of an apparatus for generating a multimedia resource according to an exemplary embodiment of the present disclosure.

FIG. 5 is a block diagram of an apparatus for generating a multimedia resource according to an exemplary embodiment of the present disclosure. Referring to FIG. 5, the apparatus includes a displaying unit 501, a determining unit 502 and a generating unit 503.

The displaying unit 501 is configured to display at least one selectable clipping template, wherein each clipping template is generated based on clipping information, and the clipping information includes at least one of clip operation information and clipping material information.

The determining unit 502 is configured to determine a target clipping template from the at least one selectable clipping template, in response to a template select instruction.

The generating unit 503 is configured to generate a second multimedia resource by processing an acquired first multimedia resource based on the target clipping template.

In the apparatus according to the embodiment of the present disclosure, by selecting the target clipping template from the selectable clipping templates, the second multimedia resource is generated by processing the first multimedia resource based on the target clipping template, such that the second multimedia resource can be acquired quickly, efficiently and automatically without manual clipping by a user, and the clipping efficiency is effectively improved. In addition, based on the clipping information, the corresponding clipping template, which is selectable to the user, is automatically generated, rather than a predetermined fixed clipping template. Thus, the user is provided with the rich and diverse clipping templates, thereby effectively meeting users' personalized clipping needs and improving the efficiency of the user in clipping the multimedia resources.

In some embodiments, the target clipping template includes at least a clip operation option; and the generating unit 503 is configured to generate the second multimedia resource by clipping the first multimedia resource based on the clip operation option.

In some embodiments, the target clipping template further includes a trigger sequence of clip operation options; and the generating unit 503 is configured to generate the second multimedia resource by clipping the first multimedia resource based on the clip operation options according to the trigger sequence.

In some embodiments, the target clipping template at least includes a material option; and the generating unit 503 is configured to acquire material content based on the material option, and generate the second multimedia resource by adding the material content to a corresponding position in the first multimedia resource.

In some embodiments, the generating unit 503 is configured to acquire the material content from a directory indicated by a material acquisition path, wherein the material acquisition path is associated with the material option.

In some embodiments, the apparatus further includes an acquiring unit and a selecting unit.

The acquiring unit is configured to acquire a history multimedia resource, wherein the history multimedia resource is configured to generate a clipping template; and the acquiring unit is further configured to acquire clipping information of the history multimedia resource.

The selecting unit is configured to select clipping information conforming to a target type from the acquired clipping information, as template data; and the generating unit 503 is further configured to generate the clipping template based on the template data.

In some embodiments, the clipping information at least includes clip operation information, and the target type at least includes a target operation type; and the selecting unit is configured to select clip operation information conforming to the target operation type from the clip operation information.

In some embodiments, the clip operation information further includes an operation sequence of a plurality of clip operations; and the selecting unit is further configured to:

correlate the clip operation information conforming to the target operation type based on the operation sequence.

In some embodiments, the clipping information at least includes clipping material information, and the target type at least includes a target material type; and the selecting unit is configured to select clipping material information conforming to the target material type from the clipping material information.

In some embodiments, the template data includes clip operation information conforming to a target operation type; and the generating unit 503 is configured to acquire the clipping template including a clip operation option by generating the clip operation option based on the clip operation information.

In some embodiments, the clip operation information conforming to the target operation type is further correlated based on an operation sequence of a plurality of clip operations; and the generating unit 503 is configured to acquire the clipping template including clip operation options and a trigger sequence of the clip operation options by generating the clip operation options and the trigger sequence based on a correlation relationship of the clip operation information conforming to the predetermined target operation type.

In some embodiments, the template data includes clipping material information conforming to a target material type; and the generating unit 503 is configured to acquire the clipping template including a material option by generating the material option based on the clipping material information.

In some embodiments, the generating unit 503 is configured to:

generate a material acquisition path associated with the corresponding material option based on a material type and a material acquisition manner in the clipping material information; and acquire the clipping template including the material option by adding material content to a directory indicated by the material acquisition path based on material content in the clipping material information.

In some embodiments, the apparatus further includes:

a first editing unit, configured to edit a clip operation option or a material option in the target clipping template in response to an edit instruction on the target clipping template; and the generating unit 503 is configured to generate the second multimedia resource by processing the first multimedia resource based on an edited target clipping template in response to a resource generate instruction.

In some embodiments, the apparatus further includes:

a second editing unit, configured to edit a clip operation option or a material option in the target clipping template in response to an edit instruction on the target clipping template; and a storing unit, configured to store an edited target clipping template in response to a store instruction.

The operations performed by the units in the apparatus in the above embodiments have been described in detail in the embodiments of the related method, and details are not described herein again.

Figure 6:
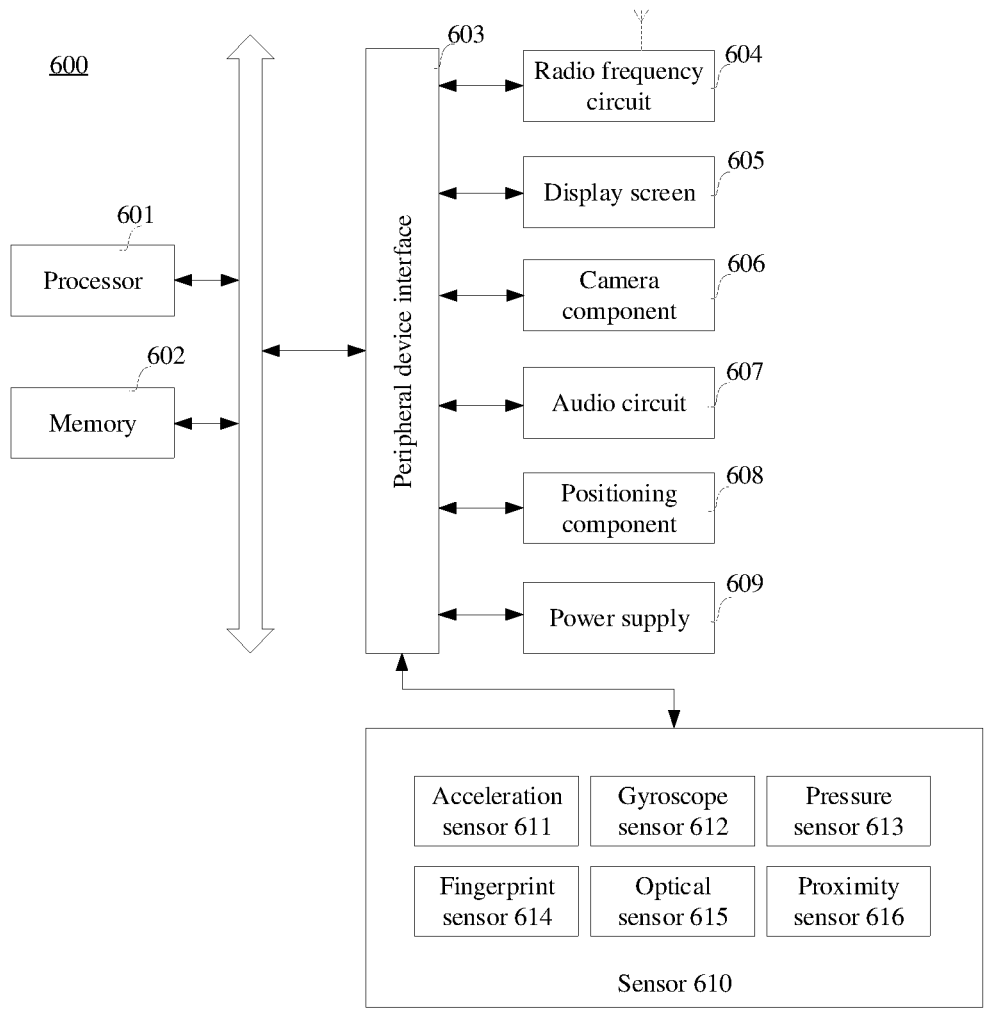
FIG. 6 is a block diagram of a terminal according to an exemplary embodiment of the present disclosure.
Figure 7:
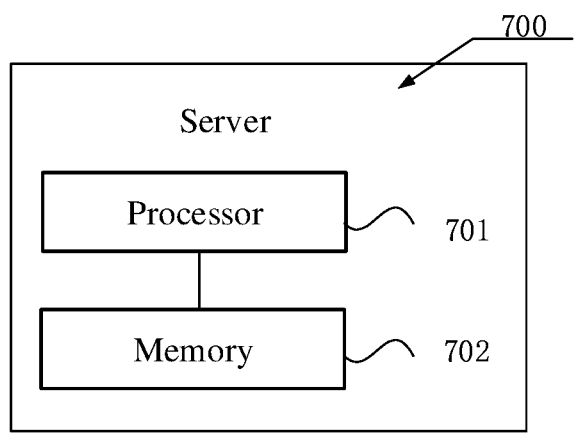
FIG. 7 is a schematic diagram of a server according to an exemplary embodiment of the present disclosure.

The electronic device is a terminal shown in FIG. 6, or a server shown in FIG. 7, which is not limited in the embodiments of the present disclosure.

FIG. 6 is a structural block diagram of a terminal according to an exemplary embodiment of the present disclosure.

The terminal 600 may be a smart phone, a tablet computer, a moving picture experts group audio layer III (MP3) player, a moving picture experts group audio layer IV (MP4) player, a laptop, or a desktop computer. The terminal 600 may also be called user equipment, a portable terminal, a laptop terminal, and a desktop terminal.

Generally, the terminal 600 includes a processor 601 and a memory 602.

The processor 601 includes one or more processing cores, such as a quad-core processor and an eight-core processor. The processor 601 is implemented in at least one hardware form of a digital signal processor (DSP), a field-programmable gate array (FPGA), and a programmable logic array (PLA). Or the processor 601 includes a main processor and a coprocessor. The main processor is a processor configured to process data in an awake state, and is also called a central processing unit (CPU). The coprocessor is a low-power-consumption processor configured to process data in a standby state. In some embodiments, the processor 601 is integrated with a graphics processing unit (GPU), and the GPU is configured to render and draw the content that needs to be displayed by a display screen. In some embodiments, the processor 601 further includes an artificial intelligence (AI) processor, and the AI processor is configured to process computational operations related to machine learning.

The memory 602 includes one or more computer-readable storage medium, and the computer-readable storage medium may be non-transitory. The memory 602 may further include a high-speed random access memory, and a non-volatile memory, such as one or more magnetic disk storage devices and flash storage devices. In some embodiments, the non-transitory computer-readable storage medium in the memory 602 is configured to store one or more instructions. The one or more instructions are configured to be executed by the processor 601 to perform the method for generating the multimedia resource according to the method embodiments of the present disclosure.

In some embodiments, the terminal 600 may further optionally include: a peripheral device interface 603 and at least one peripheral device. The processor 601, the memory 602, and the peripheral device interface 603 are connected by a bus or a signal line. Each peripheral device is connected to the peripheral device interface 603 by a bus, a signal line or a circuit board. In some embodiments, the peripheral device includes: at least one of a radio frequency circuit 604, a display screen 605, a camera component 606, an audio circuit 607, a positioning component 608, and a power supply 609.

The peripheral device interface 603 may be configured to connect at least one peripheral device associated with an input/output (I/O) to the processor 601 and the memory 602. In some embodiments, the processor 601, the memory 602 and the peripheral device interface 603 are integrated on the same chip or circuit board. In some other embodiments, any one or two of the processor 601, the memory 602, and the peripheral device interface 603 can be implemented on a separate chip or circuit board, which is not limited in the present embodiment.

The radio frequency circuit 604 is configured to receive and transmit a radio frequency (RF) signal, which is also referred to as an electromagnetic signal. The radio frequency circuit 604 communicates by means of the electromagnetic signal with a communication network and other communication devices. The radio frequency circuit 604 converts an electrical signal to the electromagnetic signal for transmission, or converts the received electromagnetic signal to the electrical signal. In some embodiments, the radio frequency circuit 604 includes an antenna system, an RF transceiver, one or more amplifiers, a tuner, an oscillator, a digital signal processor, a coding-decoding chipset, a subscriber identity module card, and the like. The radio frequency circuit 604 may communicate with other terminals via at least one wireless communication protocol. The wireless communication protocol includes, but is not limited to, a metropolitan area network, various generations of mobile communication networks (2G, 3G, 4G, and 5G), a wireless local area network, and/or a wireless fidelity (Wi-Fi) network. In some embodiments, the RF circuit 604 further include a circuit related to near-field communication (NFC), which is not limited in the present disclosure.

The display screen 605 is configured to display a user interface (UI). The UI may include graphics, texts, icons, videos, and any combination thereof. In the case that the display screen 605 is a touch display screen, the display screen 605 further has a function of acquiring a touch signal on or over the surface of the display screen 605. The touch signal may be input as a control signal to the processor 601 for processing. At this time, the display screen 605 is further configured to provide virtual buttons and/or virtual keyboards, which are also referred to as soft buttons and/or soft keyboards. In some embodiments, the display screen 605 is provided as one screen disposed on a front panel of the terminal 600. In some other embodiments, the display screens 605 is provided as at least two screens disposed respectively on different surfaces of the terminal 600 or designed as folded. In other embodiments, the display screen 605 is a flexible display screen disposed on the curved surface or a folded surface of the terminal 600. Furthermore, the display screen 605 may be provided as a non-rectangular pattern, that is, an irregular-shaped screen. The display screen 605 may be a liquid crystal display (LCD) screen, an organic light-emitting diode (OLED) screen, or the like.

The camera component 606 is configured to capture images or videos. In some embodiments, the camera component 606 includes a front camera and a rear camera. Generally, the front camera is disposed on the front panel of the terminal, and the rear camera is disposed on a rear surface of the terminal. In some embodiments, there are at least two rear cameras, i.e., a main camera, a depth-of-field camera, a wide-angle camera, and a telephoto camera, so as to implement a background blur function by combining the main camera and the depth-of-field camera, a panoramic shooting function and a virtual reality (VR) shooting function by combining the main camera and the wide-angle camera, or other fusion shooting functions. In some embodiments, the camera component 606 further includes a flashlight. The flashlight is a single-color-temperature flashlight or a dual-color-temperature flashlight. The dual-color-temperature flashlight is a combination of a warm flashlight and a cold flashlight, and provide light compensation for different color temperatures.

The audio circuit 607 may include a microphone and a speaker. The microphone is configured to acquire sound waves of the user and an environment, convert the sound waves into electrical signals, and input the electrical signals to the processor 601 for processing, or input the electrical signals to the radio frequency circuit 604 to implement voice communication. For the purpose of stereo acquisition or noise reduction, a plurality of microphones are provided and respectively disposed at different parts of the terminal 600. The microphone may also be an array microphone or an omnidirectional acquisition microphone. The speaker is configured to convert the electrical signals from the processor 601 or the radio frequency circuit 604 into sound waves. The speaker may be a conventional film speaker or a piezoelectric ceramic speaker. In the case that the speaker is the piezoelectric ceramic speaker, the electrical signal can be converted into not only human-audible sound waves but also the sound waves that are inaudible to humans for distance measurement and other purposes. In some embodiments, the audio circuit 607 further includes a headphone jack.

The positioning component 608 is configured to determine a current geographic location of the terminal 600 to implement navigation or location based service (LBS). The positioning component 608 may be the United States' Global Positioning System (GPS), Russia's Global Navigation Satellite System (GLONASS), China's BeiDou Navigation Satellite System (BDS), or the European Union's Galileo.

The power supply 609 is configured to supply power for various components in the terminal 600. The power supply 609 is alternating current, direct current, a disposable battery, or a rechargeable battery. In the case that the power supply 609 includes the rechargeable battery, the rechargeable battery may be charged in a wired mode or a wireless mode. The rechargeable battery may also support the fast-charging technology.

In some embodiments, the terminal 600 further includes one or more sensors 610. The one or more sensors 610 include, but are not limited to, an acceleration sensor 611, a gyroscope sensor 612, a pressure sensor 613, a fingerprint sensor 614, an optical sensor 615, and a proximity sensor 616.

The acceleration sensor 611 is configured to detect magnitude of accelerations on three coordinate axes of a coordinate system established for the terminal 600. For example, the acceleration sensor 611 is configured to detect components of gravitational acceleration in the three coordinate axes. The processor 601 controls the display screen 605 to display a user interface in a lateral view or a vertical view based on gravitational acceleration signals acquired by the acceleration sensor 611. The acceleration sensor 611 may also be configured to acquire motion data of a game or a user.

The gyroscope sensor 612 is configured to detect a body direction and a rotational angle of the terminal 600, and may cooperate with the acceleration sensor 611 to acquire the user's 3D motions on the terminal 600. Based on the data acquired by the gyroscope sensor 612, the processor 601 can implement the following functions: motion sensing (such as changing the UI based on a user's tilt operation), image stabilization during shooting, game control and inertial navigation.

The pressure sensor 613 may be disposed on a side frame of the terminal 600 and/or a layer under the display screen 605. In the case that the pressure sensor 613 is disposed on the side frame of the terminal 600, a user's holding signal to the terminal 600 can be detected. The processor 601 can perform left/right hand recognition or a quick operation based on the holding signal acquired by the pressure sensor 613. In the case that the pressure sensor 613 is disposed on the layer under the display screen 605, the processor 601 controls an operable control on the UI based on a user's pressure operation on the display screen 605. The operable control includes at least one of a button control, a scroll bar control, an icon control, and a menu control.

The fingerprint sensor 614 is configured to acquire a user's fingerprint. The user's identity is recognized by the processor 601 or by the fingerprint sensor 614 based on the acquired fingerprint by the fingerprint sensor 614. When it is recognized that the user's identity is trusted, the user is authorized by the processor 601 to perform related sensitive operations, such as unlocking the screen, viewing encrypted information, downloading software, paying, and changing settings. The fingerprint sensor 614 may be provided on the front, rear, or side surface of the terminal 600. In the case that the terminal 600 is provided with a physical button or its manufacturer's Logo, the fingerprint sensor 614 may be integrated with the physical button or the manufacturer's Logo.

The optical sensor 615 is configured to acquire ambient light intensity. In one embodiment, the processor 601 may control the display brightness of the display screen 605 based on the ambient light intensity acquired by the optical sensor 615. In some embodiments, in the case that the ambient light intensity is high, the display brightness of the display screen 605 is increased; and in the case that the ambient light intensity is low, the display brightness of the display screen 605 is decreased. In another embodiment, the processor 601 is further configured to dynamically adjust imaging parameters of the camera component 606 based on the ambient light intensity acquired by the optical sensor 615.

The proximity sensor 616, also referred to as a distance sensor, is generally disposed on the front panel of the terminal 600. The proximity sensor 616 is configured to acquire a distance between the user and a front surface of the terminal 600. In one embodiment, in the case that a distance between the user and the front surface of the terminal 600 detected by the proximity sensor 616 gradually decreases, the processor 601 controls the display screen 605 to switch from a screen-on state to a screen-off state. In the case that the distance between the user and the front surface of the terminal 600 detected by the proximity sensor 616 gradually increases, the processor 601 controls the display screen 605 to switch from the screen-off state to the screen-on state.

It can be understood by those skilled in the art that the structure shown in FIG. 6 does not constitute a limitation on the terminal 600. More or less components than those illustrated may be included, or some components may be combined, or different component arrangements may be provided.

FIG. 7 is a schematic structural diagram of a server according to an exemplary embodiment of the present disclosure. Significant differences may be generated when the server 700 has different configurations or performances. The server 700 may include one or more processors (CPU) 701 and one or more memories 702 storing one or more instructions therein, wherein the one or more instructions, when loaded and executed by the one or more processors 701, cause the one or more processors 701 to perform the method for generating the multimedia resource according to each of the above method embodiments. The server may further include components such as a wired or wireless network interface, a keyboard, an input/output interface, and other components for input and output. The server may further include other components for implementing device functions, which are not repeated herein.

The servers shown in FIGS. 6 and 7 are both electronic devices. The electronic device includes one or more processors, and one or more memories configured to store one or more instructions executable by the one or more processors, wherein the one or more processors, when loading and executing the one or more instructions, are caused to: display at least one selectable clipping template, wherein each clipping template is generated based on clipping information, and the clipping information includes at least one of clip operation information and clipping material information; determine a target clipping template from the at least one selectable clipping template, in response to a template select instruction; and generate a second multimedia resource by processing an acquired first multimedia resource based on the target clipping template.

The target clipping template includes at least a clip operation option; and the one or more processors, when loading and executing the one or more instructions, are caused to: generate the second multimedia resource by clipping the first multimedia resource based on the clip operation option.

The target clipping template further includes a trigger sequence of clip operation options; and the one or more processors, when loading and executing the one or more instructions, are caused to: generate the second multimedia resource by clipping the first multimedia resource based on the clip operation options according to the trigger sequence.

The target clipping template at least includes a material option; and the one or more processors, when loading and executing the one or more instructions, are caused to: acquire material content based on the material option, and generate the second multimedia resource by adding the material content to a corresponding position in the first multimedia resource.

The one or more processors, when loading and executing the one or more instructions, are caused to: acquire the material content from a directory indicated by a material acquisition path, wherein the material acquisition path is associated with the material option.

The one or more processors, when loading and executing the one or more instructions, are caused to: acquire a history multimedia resource, wherein the history multimedia resource is configured to generate a clipping template; acquire clipping information of the history multimedia resource; select clipping information conforming to a target type from the acquired clipping information, as template data; and generate the clipping template based on the template data.

The clipping information at least includes clip operation information, and the target type at least includes a target operation type; and the one or more processors, when loading and executing the one or more instructions, are caused to: select clip operation information conforming to the target operation type from the clip operation information.

The clip operation information further includes an operation sequence of a plurality of clip operations; and the one or more processors, when loading and executing the one or more instructions, are caused to: correlate the clip operation information conforming to the target operation type based on the operation sequence.

The clipping information at least includes clipping material information, and the target type at least includes a target material type; and the one or more processors, when loading and executing the one or more instructions, are caused to: select clipping material information conforming to the target material type from the clipping material information.

The template data includes clip operation information conforming to a target operation type; and the one or more processors, when loading and executing the one or more instructions, are caused to: acquire the clipping template including a clip operation option by generating the clip operation option based on the clip operation information.

The clip operation information conforming to the target operation type is further correlated based on an operation sequence of a plurality of clip operations; and the one or more processors, when loading and executing the one or more instructions, are caused to: acquire the clipping template including clip operation options and a trigger sequence of the clip operation options by generating the clip operation options and the trigger sequence based on a correlation relationship of the clip operation information conforming to the predetermined target operation type.

The template data includes clipping material information conforming to a target material type; and the one or more processors, when loading and executing the one or more instructions, are caused to: acquire the clipping template including a material option by generating the material option based on the clipping material information.

The one or more processors, when loading and executing the one or more instructions, are caused to: generate a material acquisition path associated with the material option based on a material type and a material acquisition manner in the clipping material information; and acquire the clipping template including the material option by adding material content to a directory indicated by the material acquisition path based on material content in the clipping material information.

The one or more processors, when loading and executing the one or more instructions, are caused to: edit a clip operation option or a material option in the target clipping template in response to an edit instruction on the target clipping template; and generate the second multimedia resource by processing the first multimedia resource based on an edited target clipping template in response to a resource generate instruction.

In some embodiments, the one or more processors, when loading and executing the one or more instructions, are caused to: edit a clip operation option or a material option in the target clipping template in response to an edit instruction on the target clipping template; and store an edited target clipping template in response to a store instruction.

In an exemplary embodiment, a non-transitory computer-readable storage medium including one or more instructions is further provided, such as a memory including the one or more instructions. The one or more instructions, when loaded and executed by a processor of an apparatus, cause the apparatus to perform the method for generating the multimedia resource. In some embodiments, the one or more instructions, when loaded and executed by a processor of an electronic device, cause the electronic device to: display at least one selectable clipping template, wherein each clipping template is generated based on clipping information, and the clipping information includes at least one of clip operation information and clipping material information; determine a target clipping template from the at least one selectable clipping template, in response to a template select instruction; and generate a second multimedia resource by processing an acquired first multimedia resource based on the target clipping template.

In some embodiments, the target clipping template includes at least a clip operation option; and the one or more instructions, when loaded and executed by the processor of the electronic device, further cause the electronic device to: generate the second multimedia resource by correspondingly clipping the first multimedia resource based on the clip operation option.

In some embodiments, the target clipping template further includes a trigger sequence of clip operation options; and the one or more instructions, when loaded and executed by the processor of the electronic device, further cause the electronic device to: generate the second multimedia resource by clipping the first multimedia resource based on the clip operation options according to the trigger sequence.

In some embodiments, the target clipping template at least includes a material option; and the one or more instructions, when loaded and executed by the processor of the electronic device, further cause the electronic device to: acquire material content based on the material option, and generate the second multimedia resource by adding the material content to a corresponding position in the first multimedia resource.

In some embodiments, the one or more instructions, when loaded and executed by the processor of the electronic device, further cause the electronic device to: acquire the material content from a directory indicated by a material acquisition path, wherein the material acquisition path is associated with the material option.

In some embodiments, the one or more instructions, when loaded and executed by the processor of the electronic device, further cause the electronic device to: acquire a history multimedia resource, which is configured to generate a clipping template; acquire clipping information of the history multimedia resource; select clipping information conforming to a target type from the acquired clipping information, as template data; and generate the clipping template based on the template data.

In some embodiments, the clipping information at least includes clip operation information, and the target type at least includes a target operation type; and the one or more instructions, when loaded and executed by the processor of the electronic device, further cause the electronic device to: select clip operation information conforming to the target operation type from the clip operation information.

In some embodiments, the clip operation information further includes an operation sequence of a plurality of clip operations; and the one or more instructions, when loaded and executed by the processor of the electronic device, further cause the electronic device to: correlate the clip operation information conforming to the target operation type based on the operation sequence.

In some embodiments, the clipping information at least includes clipping material information, and the target type at least includes a target material type; and the one or more instructions, when loaded and executed by the processor of the electronic device, further cause the electronic device to: select clipping material information conforming to the target material type from the clipping material information.

In some embodiments, the template data includes clip operation information conforming to a target operation type; and the one or more instructions, when loaded and executed by the processor of the electronic device, further cause the electronic device to: acquire the clipping template including a clip operation option by generating the clip operation option based on the clip operation information.

In some embodiments, the clip operation information conforming to the target operation type is further correlated based on an operation sequence of a plurality of clip operations; and the one or more instructions, when loaded and executed by the processor of the electronic device, further cause the electronic device to: acquire the clipping template including clip operation options and a trigger sequence of the clip operation options by generating the clip operation options and the trigger sequence based on a correlation relationship of the clip operation information conforming to the predetermined target operation type.

In some embodiments, the template data includes clipping material information conforming to a target material type; and the one or more instructions, when loaded and executed by the processor of the electronic device, further cause the electronic device to: acquire the clipping template including a material option by generating the material option based on the clipping material information.

In some embodiments, the one or more instructions, when loaded and executed by the processor of the electronic device, further cause the electronic device to: generate a material acquisition path associated with the material options based on a material type and a material acquisition manner in the clipping material information; and acquire the clipping template including the material option by adding material content to a directory indicated by the material acquisition path based on material content in the clipping material information.

In some embodiments, the one or more instructions, when loaded and executed by the processor of the electronic device, further cause the electronic device to: edit a clip operation option or a material option in the target clipping template in response to an edit instruction on the target clipping template; and generate the second multimedia resource by processing the first multimedia resource based on an edited target clipping template in response to a resource generate instruction.

In some embodiments, the one or more instructions, when loaded and executed by the processor of the electronic device, further cause the electronic device to: edit a clip operation option or a material option in the target clipping template in response to an edit instruction on the target clipping template; and store an edited target clipping template in response to a store instruction.

In some embodiments, the storage medium is a non-transitory computer-readable storage medium. For example, the non-transitory computer-readable storage medium is a read-only memory (ROM), a random-access memory (RAM), a compact disc read-only memory, (CD-ROM), a magnetic tape, a floppy disk, an optical data storage device, and the like.

In an exemplary embodiment, a computer program product including one or more instructions is provided, wherein the one or more instructions, when loaded and executed by a processor of an electronic device, cause the electronic device to perform the method for generating the multimedia resource according to any of the above embodiments.

All the embodiments of the present disclosure can be executed individually or in combination with other embodiments, and they are all within the scope of the present disclosure.

What is claimed is:

1. A method for generating a multimedia resource, comprising:
   displaying at least one selectable clipping template, wherein each clipping template is generated based on clipping information, and the clipping information comprises at least one of clip operation information and clipping material information;
   determining a target clipping template from the at least one selectable clipping template, in response to a template select instruction; and generating a second multimedia resource by processing an acquired first multimedia resource based on the target clipping template;

wherein the target clipping template at least comprises a material option; and said generating the second multimedia resource by processing the acquired first multimedia resource based on the target clipping template comprises:

acquiring material content based on the material option; and generating the second multimedia resource by adding the material content to a corresponding position in the acquired first multimedia resource.

2. The method according to claim 1, wherein the target clipping template comprises at least a clip operation option; and said generating the second multimedia resource by processing the acquired first multimedia resource based on the target clipping template comprises:

generating the second multimedia resource by clipping the acquired first multimedia resource based on the clip operation option.

3. The method according to claim 2, wherein the target clipping template further comprises a trigger sequence of clip operation options; and said generating the second multimedia resource by processing the acquired first multimedia resource based on the target clipping template comprises:

generating the second multimedia resource by clipping the acquired first multimedia resource based on the clip operation options according to the trigger sequence.

4. The method according to claim 1, wherein said acquiring the material content based on the material option comprises:

acquiring the material content from a directory indicated by a material acquisition path, wherein the material acquisition path is associated with the material option.

5. The method according to claim 1, further comprising:

acquiring a history multimedia resource, wherein the history multimedia resource is configured to generate a clipping template;

acquiring clipping information of the history multimedia resource;

selecting clipping information conforming to a target type from the acquired clipping information as template data; and generating the clipping template based on the template data.

6. The method according to claim 5, wherein the clipping information of the history multimedia resource at least comprises clip operation information, and the target type at least comprises a target operation type; and said selecting the clipping information conforming to the target type from the acquired clipping information as the template data comprises:

selecting clip operation information conforming to the target operation type from the clip operation information of the history multimedia resource as the template data.

7. The method according to claim 6, wherein the clip operation information of the history multimedia resource further comprises an operation sequence of a plurality of clip operations; and said selecting the clipping information conforming to the target type from the acquired clipping information further comprises:

correlating the clip operation information conforming to the target operation type based on the operation sequence.

8. The method according to claim 5, wherein the clipping information of the history multimedia resource at least comprises clipping material information, and the target type at least comprises a target material type; and said selecting the clipping information conforming to the target type from the acquired clipping information comprises:

selecting clipping material information conforming to the target material type from the clipping material information of the history multimedia resource as the template data.

9. The method according to claim 5, wherein the template data comprises clip operation information conforming to a target operation type; and said generating the clipping template based on the template data comprises:

acquiring the clipping template comprising a clip operation option by generating the clip operation option based on the clip operation information.

10. The method according to claim 9, wherein the clip operation information conforming to the target operation type is further correlated based on an operation sequence of a plurality of clip operations; and said generating the clipping template based on the template data comprises:

acquiring the clipping template comprising clip operation options and a trigger sequence of the clip operation options by generating the clip operation options and the trigger sequence based on a correlation relationship of the clip operation information conforming to the target operation type.

11. The method according to claim 5, wherein the template data comprises clipping material information conforming to a target material type; and said generating the clipping template based on the template data comprises:

acquiring the clipping template comprising a material option by generating the material option based on the clipping material information.

12. The method according to claim 11, wherein said acquiring the clipping template comprising the material option by generating the material option based on the clipping material information comprises:

generating a material acquisition path associated with the material option based on a material type and a material acquisition manner in the clipping material information; and acquiring the clipping template comprising the material option by adding material content to a directory indicated by the material acquisition path based on material content in the clipping material information.

13. The method according to claim 1, wherein generating the second multimedia resource by processing the acquired first multimedia resource based on the target clipping template comprises:

editing a clip operation option or a material option in the target clipping template in response to an edit instruction on the target clipping template; and generating the second multimedia resource by processing the acquired first multimedia resource based on an edited target clipping template in response to a resource generate instruction.

14. The method according to claim 1, wherein further comprising:

editing a clip operation option or a material option in the target clipping template in response to an edit instruction on the target clipping template; and storing an edited target clipping template in response to a store instruction.

15. An electronic device, comprising:
one or more processors; and
one or more memories configured to store one or more instructions executable by the one or more processors,
wherein the one or more processors, when loading and executing the one or more instructions, are caused to:
  display at least one selectable clipping template, wherein each clipping template is generated based on clipping information, and the clipping information comprises at least one of clip operation information and clipping material information;
  determine a target clipping template from the at least one selectable clipping template, in response to a template select instruction; and
  generate a second multimedia resource by processing an acquired first multimedia resource based on the target clipping template;
  wherein the target clipping template at least comprises a material option; and
the one or more processors, when loading and executing the one or more instructions, are further caused to:
  acquire material content based on the material option; and
  generate the second multimedia resource by adding the material content to a corresponding position in the acquired first multimedia resource.

16. The electronic device according to claim 15, wherein the target clipping template comprises at least a clip operation option; and
the one or more processors, when loading and executing the one or more instructions, are further caused to:
  generate the second multimedia resource by clipping the acquired first multimedia resource based on the clip operation option.

17. The electronic device according to claim 16, wherein the target clipping template further comprises a trigger sequence of clip operation options; and
the one or more processors, when loading and executing the one or more instructions, are further caused to:
  generate the second multimedia resource by clipping the acquired first multimedia resource based on the clip operation options according to the trigger sequence.

18. A method for generating a multimedia resource, comprising:
displaying at least one selectable clipping template, wherein each clipping template is generated based on clipping information, and the clipping information comprises at least one of clip operation information and clipping material information;
determining a target clipping template from the at least one selectable clipping template, in response to a template select instruction;
generating a second multimedia resource by processing an acquired first multimedia resource based on the target clipping template;
acquiring a history multimedia resource, wherein the history multimedia resource is configured to generate a clipping template;
acquiring clipping information of the history multimedia resource;
selecting clipping information conforming to a target type from the acquired clipping information as template data; and
generating the clipping template based on the template data.

* * * * *